United States Patent
Craine

(10) Patent No.: US 8,774,036 B2
(45) Date of Patent: *Jul. 8, 2014

(54) MULTI-MODE MOBILE NETWORKING DEVICE

(75) Inventor: Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 143 days.

This patent is subject to a terminal disclaimer.

(21) Appl. No.: 13/300,857

(22) Filed: Nov. 21, 2011

(65) Prior Publication Data

US 2012/0063365 A1    Mar. 15, 2012

Related U.S. Application Data

(63) Continuation of application No. 11/860,369, filed on Sep. 24, 2007, now Pat. No. 8,085,680.

(51) Int. Cl.
*H04W 4/00*    (2009.01)

(52) U.S. Cl.
USPC ............................ 370/252; 370/328; 455/420

(58) Field of Classification Search
None
See application file for complete search history.

(56) References Cited

U.S. PATENT DOCUMENTS

| | | | |
|---|---|---|---|
| 5,640,696 A | 6/1997 | Ishikawa et al. | |
| 6,160,804 A | 12/2000 | Ahmed et al. | |
| 6,731,952 B2 | 5/2004 | Schaeffer et al. | |
| 6,775,258 B1 | 8/2004 | Van Valkenburg et al. | |
| 6,816,460 B1 | 11/2004 | Ahmed et al. | |
| 7,177,594 B2 | 2/2007 | Burr | |
| 8,085,680 B1 * | 12/2011 | Craine | 370/252 |
| 2003/0045296 A1 | 3/2003 | Burr | |
| 2003/0226013 A1 | 12/2003 | Dutertre | |
| 2003/0233538 A1 | 12/2003 | Dutertre | |
| 2004/0012686 A1 | 1/2004 | Ono et al. | |
| 2005/0052318 A1 | 3/2005 | Jendbro et al. | |
| 2005/0245292 A1 | 11/2005 | Bennett et al. | |
| 2006/0044407 A1 | 3/2006 | Barbeau | |
| 2006/0099956 A1 * | 5/2006 | Harada et al. | 455/452.2 |
| 2007/0141988 A1 * | 6/2007 | Kuehnel et al. | 455/41.2 |
| 2007/0147317 A1 | 6/2007 | Smith et al. | |
| 2008/0117965 A1 * | 5/2008 | Vysotsky et al. | 375/240.01 |
| 2008/0318616 A1 | 12/2008 | Chipalkatti et al. | |

OTHER PUBLICATIONS

Julia Layton & Curt Franklin, "How Bluetooth Works," available date Nov. 23, 2006, http://electronics.howstuffworks.com/bluetooth.htm/printable.

Julia Layton, Marshall Brain & Jeff Tyson, "How Cell Phones Work," available date Nov. 20, 2006, http://electronics.howstuffworks.com/cell-phone.htm/printable.

Marshall Brain, "Inside a Cell Phone," available date Nov. 20, 2006, http://electronics.howstuffworks.com/inside-cell-phone.htm.

"Mobile Phone," Wikipedia, available date Nov. 20, 2006, http://en.wikipedia.org/wiki/Mobile_phone.

(Continued)

*Primary Examiner* — Chi Pham
*Assistant Examiner* — Shick Hom
(74) *Attorney, Agent, or Firm* — Hartman & Citrin LLC

(57) ABSTRACT

Establishing a mobile ad-hoc network between mobile network devices may include transmitting a signal from a first mobile network device using a plurality of communications formats. One or more other mobile network devices may receive the broadcast signal, select a communications format from the plurality of communications formats and respond to the signal using the selected communications format.

20 Claims, 5 Drawing Sheets

(56) References Cited

OTHER PUBLICATIONS

"Wireless LAN," Wikipedia, available date Mar. 14, 2007, http://en.wikipedia.org/wiki/Wireless_LAN.
"Exchangeable Image File Format," Wikipedia, available date Nov. 25, 2006, http://en.wikipedia.org/wiki/Exchangeable_image_file_format.
"Mobile Radio Telephone," Wikipedia, available date Nov. 20, 2006, http://en.wikipedia.org/wiki/OG.
"Improved Mobile Telephone Service," Wikipedia, available date Nov. 20, 2006, http://en.wikipedia.org/wiki/ Improved_Mobile_Telephone_Service.
"Mobile Ad-hoc Network," available date Jun. 26, 2007, http://www.answers.com/topic/mobile-ad-hoc-network?cat=technology.
WLANA, "Introduction to Wireless LANs," p. 1-9, Jan. 1, 2002, www.wlana.org.
"Cingular 8125 Pocket PC," Cingular, available date Mar. 27, 2007.
Lisa Gade, "Cingular 8125 Review," MobileTechReview, available date Mar. 27, 2007, http://www.mobiletechreview.com/ cingular-8125.htm.
"Picture Transfer Protocol over IP," published Sep. 13, 2004, available date Mar. 14, 2007, http://www.dpreview.com/news/0409/04091301nikonptpip.asp.
"Picture Transfer Protocol—PTP—Now an International Standard," published Sep. 29, 2005, available date Nov. 15, 2006, http:1/www.fotonation.com/index.php?module=company.news&id=18.
David McDowell, "Standards Update," IS&T Reporter "The Window on Imagine", vol. 16, No. 3, Jun. 2001, p. 1-3.
"New Protocol 'PTP/IP' for Image Data Transfer from a Digital Camera via Wireless LAN," Nikon, published Sep. 2004, p. 1-2.
"Wireless Overview—Anatomy of a radio LAN," available date Mar. 14, 2007, http://www.hpl.hp.com/personal/ JeanTourrilhes/Linux/Linux.Wireless.wlan.html.
U.S. Office Action dated Aug. 5, 2010 in U.S. Appl. No. 11/860,369.
U.S. Office Action dated Dec. 22, 2010 in U.S. Appl. No. 11/860,369.
U.S. Office Action dated Apr. 8, 2011 in U.S. Appl. No. 11/860,369.
U.S. Notice of Allowance dated Aug. 24, 2011 in U.S. Appl. No. 11/860,369.
WLANA, "Introduction to Wireless LANs," p. 1-9, copyright date 1999, www.wlana.org/intro/introduction/intro.pdf [accessed via WayBack Machine Internet Archive Service].

* cited by examiner

MULTI-MODE MOBILE NETWORKING DEVICE

This application is a continuation of U.S. patent application Ser. No. 11/860,369, filed Sep. 24, 2007, now U.S. Pat. No. 8,085,680, the content of which is hereby incorporated by reference herein in its entirety into this disclosure.

FIELD OF THE DISCLOSURE

The present disclosure relates to mobile networking devices having multi-mode data communication capabilities.

BACKGROUND

Wireless communications devices such as cellular phones have become a part of everyday life. People routinely interact with their family and friends by talking, texting and exchanging digital images with one another.

Current wireless communications devices have a limited ability to broadcast to other wireless communications devices absent a cellular network, the internet or other wireless network. One exception is a peer to peer or ad-hoc communications network wherein the wireless communications devices communicate directly with one another.

The Institute of Electrical and Electronics Engineers (IEEE) 802.11 defines the physical layer and the media access control (MAC) layers for a wireless local area network (LAN). IEEE 802.11 has two basic modes of operation. An ad-hoc mode that enables peer to peer transmissions between mobile communications devices and an infrastructure mode in which the mobile communications devices communicate via an access point. The access point serves as a bridge between the mobile communications devices when they are out of range of one another and typically includes some type of wired communications network.

In mobile ad-hoc networks the mobile communications devices typically move about randomly and arrange themselves arbitrarily. Thus, a mobile ad-hoc network's topology may change constantly and unpredictably, preventing reliable and continuous communications between devices. Moreover, a new mobile communications device may attempt to access the mobile ad-hoc network using a different communications mode. For example, the ad-hoc network may be communicating via BLUETOOTH and the new device may attempt to communicate via radio frequency (RF). This dynamic nature of mobile ad-hoc networks may result in lost and dropped communications.

There is a need for an improved method of establishing mobile ad-hoc networks between mobile communications devices which change their positions and modes of communication constantly and unpredictably.

SUMMARY

Techniques and systems for establishing a mobile ad-hoc network between mobile network devices are described herein.

In one implementation, a method for establishing a mobile ad-hoc network includes transmitting a signal from a first mobile network device to a second mobile network device using a plurality of communications formats. The second mobile network device receives the broadcast signal, selects a communications format from the plurality of communications formats and responds to the signal using the selected communications format.

In another implementation, a device for establishing a mobile ad-hoc network includes a user interface for receiving a message or content from a user, a storage device for storing a lookup table with communications modes that correspond to other mobile network devices, and a wireless communications interface configured to transmit in a plurality of communications modes. The wireless communications interface transmits the received message to the one or more other mobile network devices using the one or more communications modes listed in the lookup table.

Other systems, methods, and/or computer program products according to embodiments will be or become apparent to one with skill in the art upon review of the following drawings and detailed description. It is intended that all such additional systems, methods, and/or computer products be included within this description, be within the scope of the present invention, and be protected by the accompanying claims.

BRIEF DESCRIPTION OF THE DRAWINGS

The disclosure is made with reference to the accompanying figures. In the figures, the left most reference number digit identifies the figure in which the reference number first appears. The use of the same reference numbers in different figures indicates similar or identical terms.

DETAILED DESCRIPTION

Figure 1:
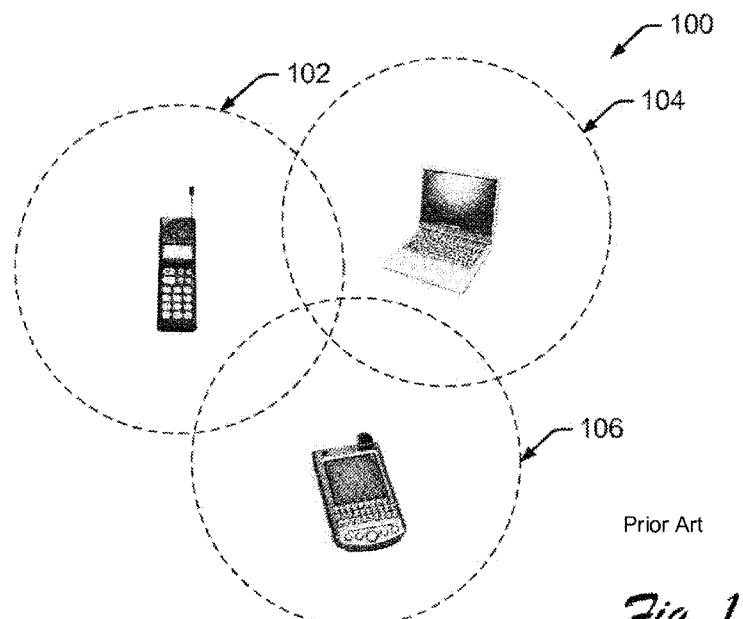
FIG. 1 depicts a mobile ad-hoc network in accordance with an illustrative embodiment.

Referring to FIG. 1, a mobile ad-hoc communications network 100 may be established between a plurality of mobile network devices such as mobile telephones 102, personal computers 104, personal digital assistants (PDA's) 106 or other suitable wireless communications devices. Each device 102-106 may contain a wireless transceiver, which may use a number of wireless communications protocols to communicate. These protocols may include; BLUETOOTH (Bluetooth System, version 1.1 Feb. 22, 2001), WiFi (IEEE standard 802.11), infrared (IrMC version 1.1), cellular communications network (G2 and G3 standards), radio frequency (e.g., switched mesh) and other suitable wireless communications formats.

Figure 2:
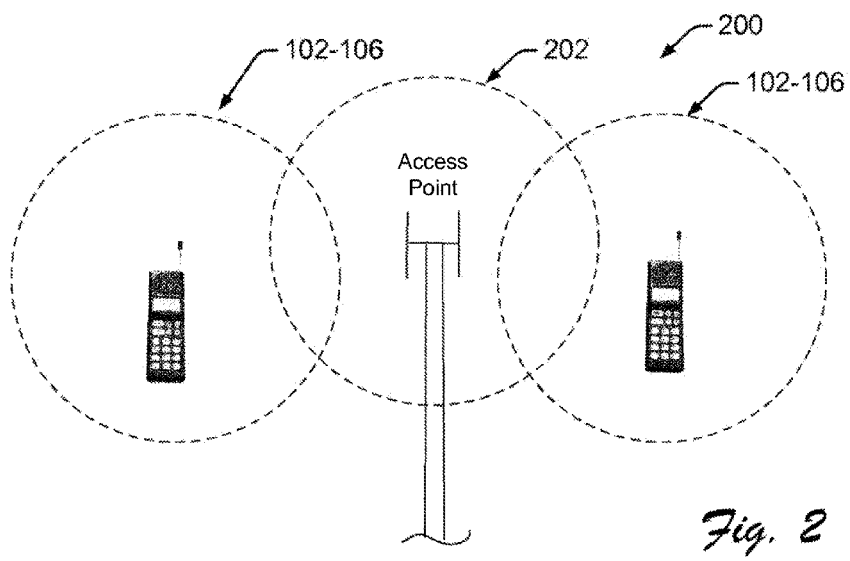
FIG. 2 depicts mobile wireless devices communicating via an access point in accordance with an illustrative embodiment.

Referring to FIG. 2, a mobile ad-hoc communications network 200 may also be established via an access point 202 that serves as a bridge between the mobile communications devices (102-106). The access point 202 is typically part of a wired communications network such as a cellular phone network, a WiFi network, an intranet, an internet or other suitable wired communications network. Alternatively, the access point 202 could be another wireless communications device that acts as a transponder to receive and retransmit the communications between the mobile communications devices (102-106).

Figure 3:
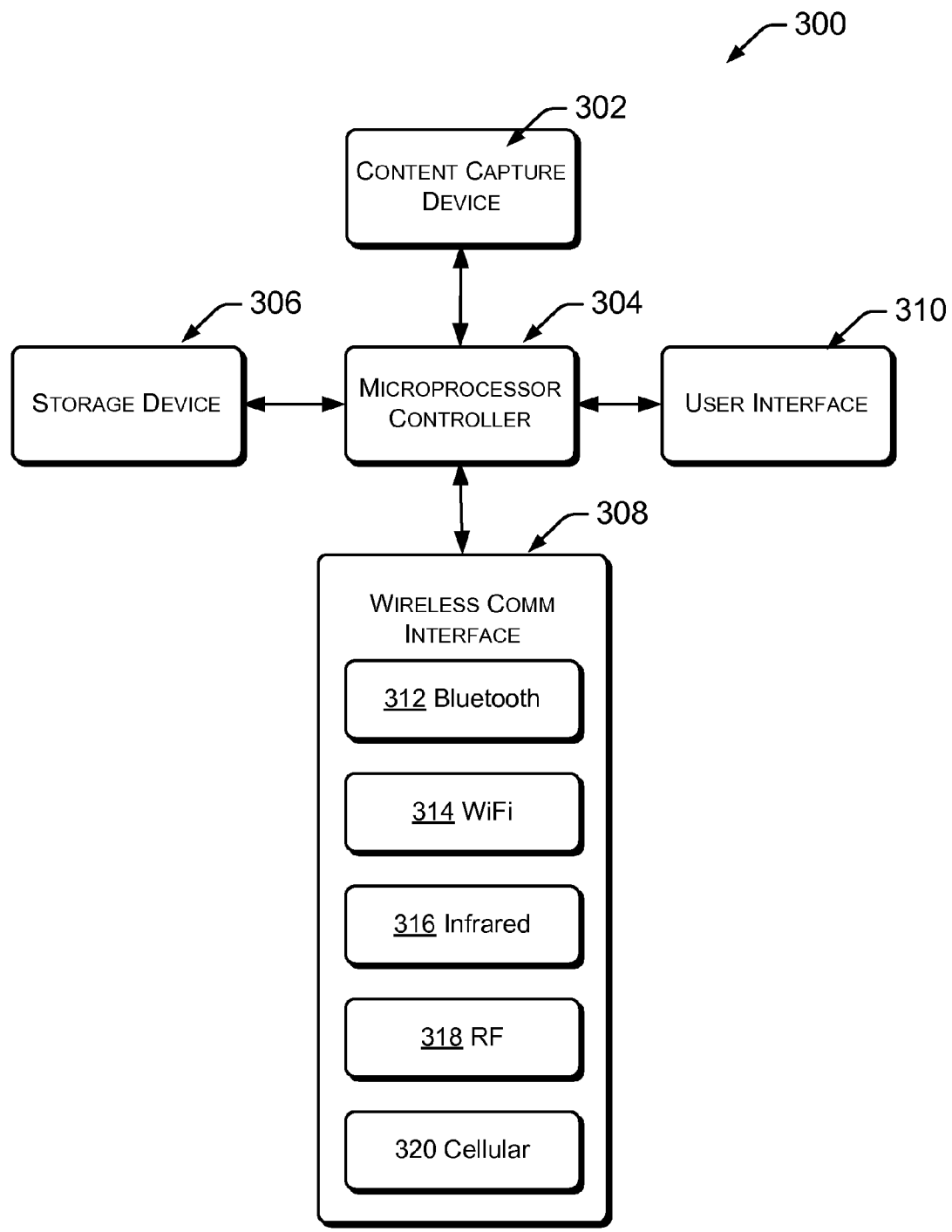
FIG. 3 is a block diagram of a mobile network device in accordance with another illustrative embodiment.

FIG. 3 illustrates a mobile network device 300 for sharing digital content in real time, or substantially real time, with other mobile network devices 300 in accordance with an illustrative embodiment. The mobile network device 300 may be a radio, a cellular phone, a personal digital assistant (PDA), a personal computer or any other suitable wireless communications device. The mobile network device 300 may include a content capture device 302, a microprocessor 304, a storage device 306, a wireless communications interface 308, and a user interface 310.

The content capture device 302 may include a digital camera/video recorder for capturing digital images, a microphone for capturing sound, a key pad or touch screen for inputting content or other suitable content capture devices. Once the content has been captured, it is processed by the microprocessor 304 and placed in the proper format for transmission. In some instances the content may be compressed. For example, still images may be compressed and stored in joint photographic experts group (JPEG) format or tagged image file format (TIFF), among other formats. Digital video may be compressed and stored in moving pictures experts group (MPEG) format, for example. The storage device 306 may include flash memory (FLASH), dynamic random access memory (DRAM), digital video recorder (DVR) and/or any other suitable storage format for storing the captured content.

When a user decides to transmit content or communicate with another wireless communications device 300, he may input a command through the user interface 310. The user interface 310 may include a key pad, a touch screen, a pointing device or other suitable input device. The microprocessor 304 receives the command from the user interface 310 and retrieves the digital content from the storage device 306. The microprocessor 304 then transmits the digital content via the wireless communications interface 308. The wireless communications interface 308 may communicate via various communications modules including a BLUETOOTH module 312, a WiFi module 314, an infrared module 316, a radio frequency (RF) module 318, a cellular communications (e.g., GSM, CDMA, WCDMA, etc.) module 320, and/or other suitable wireless communications formats.

Alternatively, the mobile network device 300 may be configured to automatically capture, compress, store and/or broadcast the content. Additionally, the broadcast could be indiscriminate (e.g., to any devices within range) or to specific devices (e.g., devices that are registered with the mobile network device 300).

While an illustrative implementation of the mobile network device 300 has been shown and described herein, it should be understood that the components and features of the device may be rearranged, omitted, modified, and/or combined with one another.

Having described the mobile network device 300, the discussion now shifts to methods for transmitting content between the mobile network devices 300. In an illustrative embodiment, the mobile network device 300 broadcasts digital content to one or more other mobile network devices 300. The broadcast may be transmitted indiscriminately to any mobile network device 300 within range, or may be transmitted to one or more predetermined mobile network devices 300. In another illustrative embodiment, the mobile network device 300 may broadcast the digital content to an access point, such as the access point 202, which in turn relays the digital content to the second mobile network device 300. The content may include still images, video, voice, music, graphics, or other suitable digital content.

Figure 4:
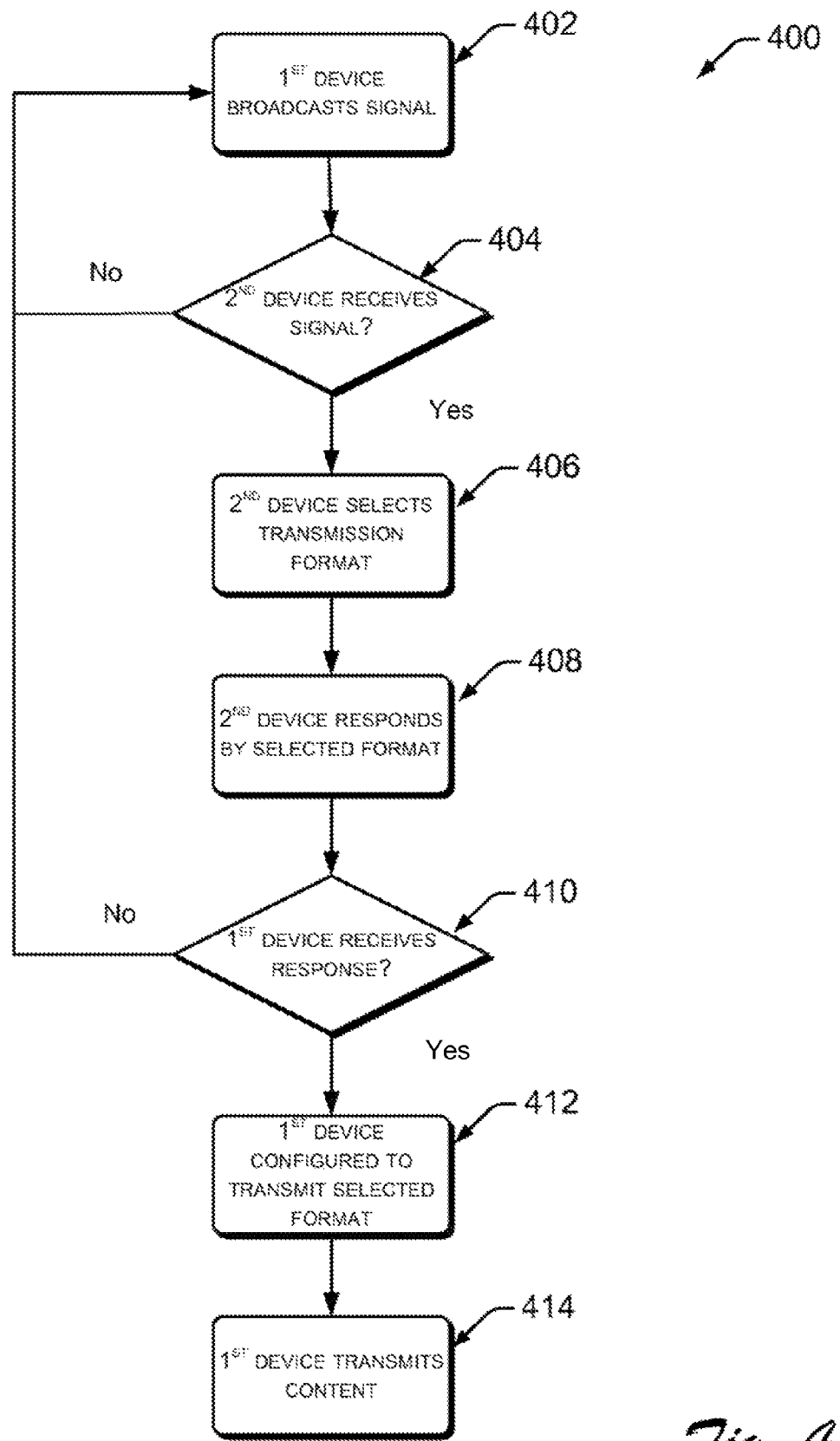
FIG. 4 is a block diagram illustrating a method of establishing a mobile ad-hoc network in accordance with an illustrative embodiment.

Methods in accordance with the present invention begin by broadcasting a signal from a first mobile network device, such as the mobile network device 300, to one or more other mobile network devices 300 in a plurality of communications formats. For example, FIG. 4 illustrates a method 400 of establishing a mobile ad-hoc communications network in accordance with an illustrative embodiment.

At block 402, the first network device 300 broadcasts a control signal to one or more mobile network devices 300 via a plurality of communications formats. The control signal may include the first mobile network device's name, the requirements of the specific communications protocol, the device's clock offset, the device's features, and/or any other suitable information. As previously noted, the control signal may be broadcast in a number of different communications formats, including Wi-Fi, BLUETOOTH, infrared, cellular communications format (e.g., GSM, CDMA, WCDMA) or any other suitable wireless communications format or protocol.

The first mobile network device 300 may broadcast in any or all of these formats depending on the specific situation. For example, if the first mobile device 300 is outside cellular coverage it may elect to not broadcast in the cellular communications format and only broadcast in Wi-Fi, BLUETOOTH, RF or another suitable wireless communications format. Alternatively, if the user desires to transmit a high volume of content, he may elect to broadcast in only high bandwidth formats. In still other alternatives, the first mobile network device 300 may opt to transmit in the most commonly used formats, in formats requiring the least power consumption, or in formats having the greatest transmission distance.

At block 404, the second mobile network device 300 receives the control signal broadcast by the first mobile network device 300. Alternatively, the second mobile network device 300 may not receive the control signal, in which case, communications is not established between the mobile network devices.

At block 406, the second mobile network device 300 selects one or more communications formats from the communications formats detected in which to respond. Like the first mobile network device 300, the second mobile network device 300 may select a particular format because of the availability or proximity of the access point 202, the transmission capability of the second mobile network device 300, or the bandwidth required to effectively transmit the message. Alternatively, the second mobile network device 300 may decide to transmit in infrared because of security concerns or RF because of its relatively long transmission distance, for example.

At block 408, the second mobile network device 300 responds to the control signal from the first mobile network device 300. The response could be in the form of a handshake establishing the communications protocol between the mobile network devices 300. The handshake may include data transfer rates, parity, interrupt procedures and other protocol or device features, for example. Alternatively, the second mobile network device 300 may respond in the communications format selected by the first mobile network device 300. For example, the second mobile networking device 300 may be capable of communicating via several communications protocols, but because the first mobile network device 300 has selected and transmitted in a particular format, the second mobile network device 300 responds in that selected format.

At block 410, the first mobile network device 300 receives the response from the second mobile network device 300. As noted, the response could be in the form of a handshake establishing the communications protocol between the mobile network devices 300, or the second mobile network device 300 may respond directly. Alternatively, if the first mobile network device 300 does not receive the response, it may rebroadcast the control signal a predetermined number of times (e.g., one, two, three or more times) or a predetermined length of time (e.g., five, fifteen or thirty seconds) to establish communications. Alternatively, the user of the first mobile network device 300 may conclude that other mobile communications devices 300 are not present and stop broadcasting.

At block 412, once the first mobile network device 300 has received the response from the second mobile network device 300, the first mobile network device configures its wireless communications interface 308 to communicate with the second mobile network device 300. In addition, the first mobile network device 300 may store the second mobile network device's communications parameters in a look-up table 500 residing in the first mobile network device's memory 306. Additionally or alternatively, the second mobile network device 300 may store the first mobile network device's communication parameters in a lookup table, such as the lookup table 500, residing in the second mobile network device's memory 306. At block 414, the first mobile network device 300 communicates or transmits its content to the second mobile network device 300 via the selected communications format.

Figure 5:
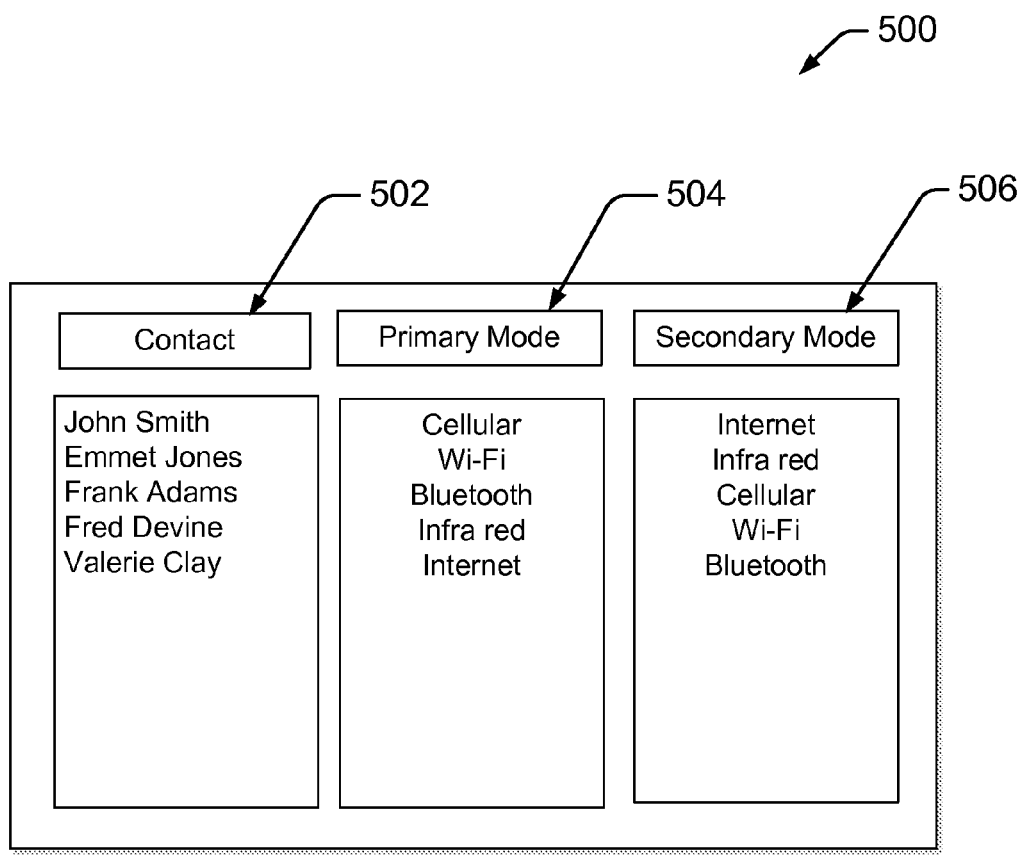
FIG. 5 depicts a lookup table in accordance with an illustrative embodiment.

FIG. 5 depicts the look-up table 500 in accordance with an illustrative embodiment. The first mobile network device 300 and the mobile network devices 300 that the first mobile network device communicates with may each have look-up tables, such as the lookup table 500. The illustrative look-up table 500 may include the persons name or contact information 502, a primary communication mode 504, and one or more secondary or backup communications modes 506. The contact information 502 may include a businesses name, a personal or business affiliation, a group affiliation, or other form of identification. The lookup table 500 may also include the primary 504 and secondary 506 modes of communication for each mobile network device 300. The primary mode 504 would be the first or primary mode of communication with that mobile network device 300. The secondary mode 506 would be used in the event that the mobile network device 300 failed to respond or had difficulty responding using the primary mode 504.

The mobile network device 300 may exchange or share its look-up table 500 among or between other mobile network devices 300 to form a multimode ad-hoc network. For example, the first mobile network device 300 could broadcast its look-up table 500 to all the mobile network devices 300 listed in its look-up table 500 via their primary 504 or secondary 506 communications modes. The other mobile network devices 300 could then place the look up table 500 in the memory 306. Using the communications modes specified in the look-up table 500, the mobile network devices 300 could then establish a multi-mode ad-hoc network using the various communications modes.

Figure 6:
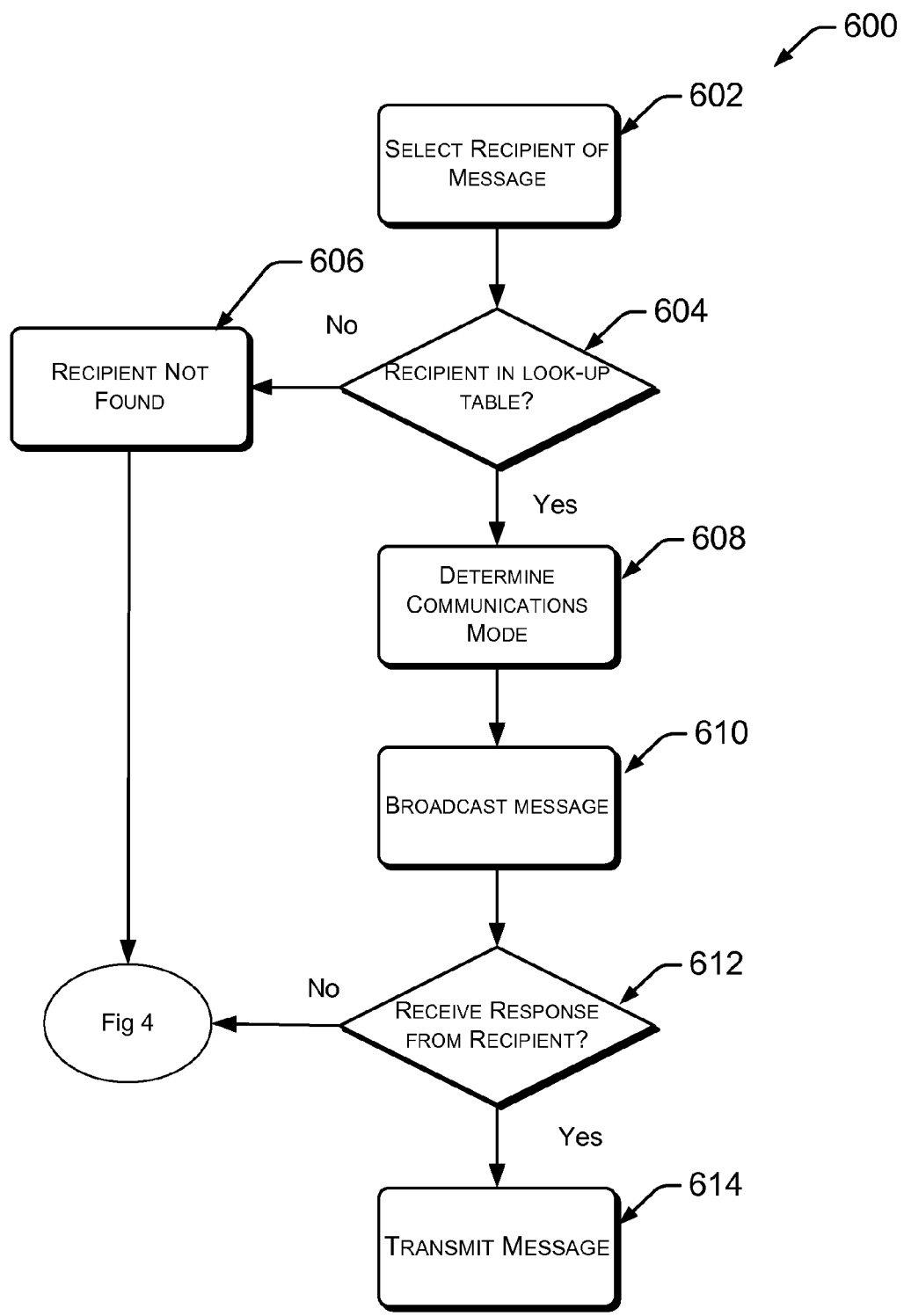
FIG. 6 is a block diagram illustrating a method for establishing a mobile ad-hoc network in accordance with another illustrative embodiment.

Establishing a multi-mode ad-hoc network is simplified once a mobile network device, such as the mobile network device 300, has communicated with other mobile network devices 300 and recorded their contact information in its lookup table 500. FIG. 6 illustrates a method 600 for establishing a mobile ad-hoc network in accordance with another illustrative embodiment.

The mobile network device 300 first selects a person, business, group or recipient with which to communicate, at block 602. The mobile network device 300 then determines whether the intended recipient is in its look-up table 500, at block 604. This could be determined by the user scanning the look-up table 500 and selecting the intended recipient. Alternatively, the user could enter the intended recipient's name or contact information into the mobile network device 300 and the network device's microprocessor 304 could then search for the intended recipient and display their contact information via the user interface 310. Additionally or alternatively, the mobile network device 300 could independently or partially independently (i.e., with limited input from the user) search for an intended recipient or group of intended recipients. For example, the user could input some selection criteria (e.g., family member, co-worker, best friend) and the mobile network device's microprocessor 304 could search the device's lookup table 500 for the intended recipient or list of intended recipients. In yet another example, the mobile network device 500 may simply broadcast to all the mobile network devices 500 that are in its lookup table.

If the intended recipient is not found in the look-up table 500, the mobile network device 300 may display "RECIPIENT NOT FOUND" via its user interface 310, at block 606. If the intended recipient is not found and the user still desires to communicate with them, a mobile ad-hoc communications network may be established in accordance with the method described with respect to FIG. 4.

Once the mobile network device 300 has established that the intended recipient is in the mobile network device's look-up table 500, the appropriate mode of communications is determined, at block 608. The user may select the intended recipient's primary mode of communications 504 or alternatively he may select the recipient's secondary modes of communications 506.

Once the intended recipient's communications mode has been determined, the mobile network device 300 contacts the intended recipient, at block 610. The broadcast may be in the form of a handshake establishing the communications protocol between the mobile network devices 300. Alternatively, if the intended recipient employs a single communications mode or typically employs a specific communications mode, the mobile network device 300 may broadcast the message or content directly to the intended recipient.

If the intended recipient receives the handshake they may respond with the appropriate protocol information (e.g., clock offset, transfer rate, parity, interrupt procedures etc.), at block 612. Alternatively, the intended recipient may respond to the user's message by transmitting directly to them (e.g., without handshaking).

Once the mobile network devices 300 have exchanged communications protocols and established communications, the user may transmit the desired message, content (e.g., pictures, text, video, music, etc.), or other form of communication to the intended recipient, at block 614.

It should be appreciated that any of the methods or acts described above may be implemented by a processor, computing device, or mobile network device 300 based on instructions stored on one or more computer-readable media. Computer-readable media can be any available media that can be accessed locally or remotely by the computing device. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory, optical storage (e.g., CD's, DVD's, or other optical storage media), magnetic storage (e.g., magnetic cassettes, magnetic tape, magnetic disks or other magnetic storage media), or any other medium which can be used to store the desired information and which can be accessed by a computing device. Combinations of the any of the above are included within the scope of computer-readable media.

While several illustrative methods of establishing a mobile ad-hoc network have been shown and described, it should be understood that the acts of each of the methods may be rearranged, omitted, modified, and/or combined with one another.

CONCLUSION

Although the devices and methods for establishing a mobile ad-hoc network have been described in language specific to certain features and methods, it is to be understood that the features defined in the appended claims are not limited to the specific features and methods described. Rather the specific features and methods are disclosed as illustrative forms of implementing the claimed subject matter.

What is claimed is:

1. A method of establishing a mobile ad hoc network between a plurality of mobile network devices, the method comprising:
broadcasting a control signal through a wireless communications interface from a first mobile network device, the control signal simultaneously broadcast in a plurality of communications formats, the control signal including requirements of a communications protocol;
wherein the first mobile network device receives a response signal in a format selected from the plurality of communications formats, and configures the wireless communications interface to communicate in the format selected from the plurality of communications formats.

2. The method of claim 1, wherein the response signal is received from a responding network device.

3. The method of claim 2, further comprising transmitting content from the first mobile network device to the responding network device in the format selected from the plurality of communications formats.

4. The method of claim 2, further comprising associating the responding network device and the format selected from the plurality of communications formats in a look-up table residing in the first mobile network device.

5. The method of claim 1, further comprising capturing content by the first mobile network device for transmission to at least one other network device.

6. The method of claim 1, wherein the response signal is received in one of a primary and secondary communications mode of the first mobile network device.

7. A non-transitory computer-readable medium storing computer-readable instructions that, when executed by a first mobile network device comprising a processor and a wireless communications interface, causes the first mobile network device to perform operations comprising:
broadcasting a control signal, the control signal simultaneously broadcast in a plurality of communications formats, the control signal including requirements of a communications protocol;
receiving a response signal from a responding network device, the response signal broadcast in a format selected from the plurality of communications formats; and
configuring the wireless communications interface to communicate with the responding network device in the format selected from the plurality of communications formats.

8. The non-transitory computer-readable medium of claim 7, wherein the operations further comprise associating the responding network device and the format selected from the plurality of communications formats in a look-up table residing in the first mobile network device.

9. The non-transitory computer-readable medium of claim 8, wherein the operations further comprise selecting at least one other network device to receive a message.

10. The non-transitory computer-readable medium of claim 9, wherein the operations further comprise searching in the lookup table for at least one communications format that corresponds to the at least one other network device.

11. The non-transitory computer-readable medium of claim 10, wherein the operations further comprise transmitting a message to a plurality of network devices in a plurality of communications formats, simultaneously, that correspond to the plurality of network devices.

12. The non-transitory computer-readable medium of claim 10, wherein searching for at least one communications format includes searching for a primary and a secondary communication format.

13. A first mobile network device for establishing a mobile ad-hoc network, the first mobile network device comprising:
a processor and a wireless communications interface; and
a memory storing instructions that, when executed by the processor, cause the processor to perform operations comprising
transmitting a control signal in a plurality of communications modes, simultaneously, the control signal including requirements of a communications protocol,
receiving a response signal from a responding network device, the response signal broadcast in a format selected from the plurality of communications formats, and
configuring the wireless communications interface to communicate with the responding network device in the format selected from the plurality of communications formats.

14. The first mobile network device of claim 13, wherein the operations further comprise storing a lookup table, the lookup table including at least one communications mode corresponding to at least one other network device.

15. The first mobile network device of claim 14, wherein the lookup table contains a primary and a secondary mode of communication that corresponds to the at least one other network device.

16. The first mobile network device of claim 14, wherein the wireless communications interface is further configured to associate the responding network device and the format selected from the plurality of communications formats in the look-up table.

17. The first mobile network device of claim 16, wherein the wireless communications interface is further configured to transmit a message to a plurality of network devices using a plurality of associated communications modes listed in the lookup table.

18. The first mobile network device of claim 13, further comprising a content capture device for capturing content for transmission to the responding network device.

19. The first mobile network device of claim 13, wherein the plurality of communications formats comprises at least one of WiFi, radio frequency, infrared, internet, or cellular communications formats.

20. The first mobile network device of claim 17, wherein the message is transmitted to the plurality of network devices via an access point.

* * * * *